United States Patent [19]

Sakai

[11] Patent Number: 4,710,151

[45] Date of Patent: Dec. 1, 1987

[54] SYSTEM FOR CONTROLLING THE PRESSURE OF OIL IN A SYSTEM FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 879,650

[22] Filed: Jun. 27, 1986

[30] Foreign Application Priority Data

Jun. 29, 1985 [JP] Japan .............................. 60-143473

[51] Int. Cl.$^4$ .............................................. F16H 11/04
[52] U.S. Cl. ........................................ 474/28; 474/18
[58] Field of Search ................... 474/28, 18, 11, 70; 74/864, 867, 868

[56] References Cited

U.S. PATENT DOCUMENTS

| | | | |
|---|---|---|---|
| 4,369,675 | 1/1983 | Van Deursen | 474/28 X |
| 4,459,879 | 7/1984 | Miki et al. | 474/18 X |
| 4,534,243 | 8/1985 | Yokoyama et al. | 474/28 X |
| 4,547,178 | 10/1985 | Hayakawa et al. | 474/28 X |

Primary Examiner—Stephen J. Novosad
Assistant Examiner—Thuy M. Bui
Attorney, Agent, or Firm—Martin A. Farber

[57] ABSTRACT

A control system for a continuously variable transmission has a line pressure control valve having ports and a spool for controlling the line pressure of oil supplied to a cylinder of a drive pulley. A hydraulic circuit is provided for supplying oil to a port of the line pressure control valve so as to shift the spool. A pressure reducing valve is provided in the hydraulic circuit for keeping the pressure in the circuit constant and a control valve is provided in the hydraulic circuit so as to control the quantity of the constant pressure oil supplied to the end of the spool.

9 Claims, 7 Drawing Figures

(a) LINE PRESSURE vs FIRST CONTROL PRESSURE (b) FIRST CONTROL PRESSURE vs DUTY RATIO (c) LINE PRESSURE vs DUTY RATIO

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling pressure applied to control valves in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates to determine the transmission ratio in accordance with the opening degree of the throttle valve of the engine and the speed of the engine. The line pressure control valve is adapted to control the line pressure in accordance with the transmission ratio and the engine speed. The line pressure is controlled to prevent the belt from slipping on the pulleys in order to transmit the output of the engine.

At idling of the engine, the transmission ratio is set at a maximum value, and the line pressure is at a maximum value. When the accelerator pedal of the vehicle is depressed, a clutch is engaged to start the vehicle. When the vehicle speed and engine speed reach set values under a driving condition, the transmission ratio starts to change (upshift). At that time if the engine speed is kept constant, the transmission ratio is automatically and continuously reduced at a speed which is determined by the line pressure, the pressure of oil supplied to the servo device of the drive pulley, and the actual transmission ratio.

In such a system, it is preferable to control the positions of the spools of the line control valve and transmission ratio control valve by control oil which is supplied to an end of each spool through a control valve. The position of the spool is controlled by controlling the quantity of oil draining from the control valve. A pressure control system is proposed, in which the control oil is obtained by raising the pressure of the drain oil discharged from the line pressure control valve. On the other hand, the line pressure is kept at a high value at low engine speed as described above. However, at low engine speed, since the discharge of the pump is small, problems such as large reduction of the control pressure or extremely high control pressure may arise at low or high engine speed. Such fluctuation of the control pressure causes malfunction of the control valve.

SUMMARY OF THE INVENTION

The object of the present invention is to provide a system which may produce control oil having a constant pressure for controlling control valves.

The other objects and features of this invention will be understood from the following description with reference to the accompanying drawings.

DETAILED DESCRIPTION OF THE PREFERRED EMBODIMENT

Figure 1:
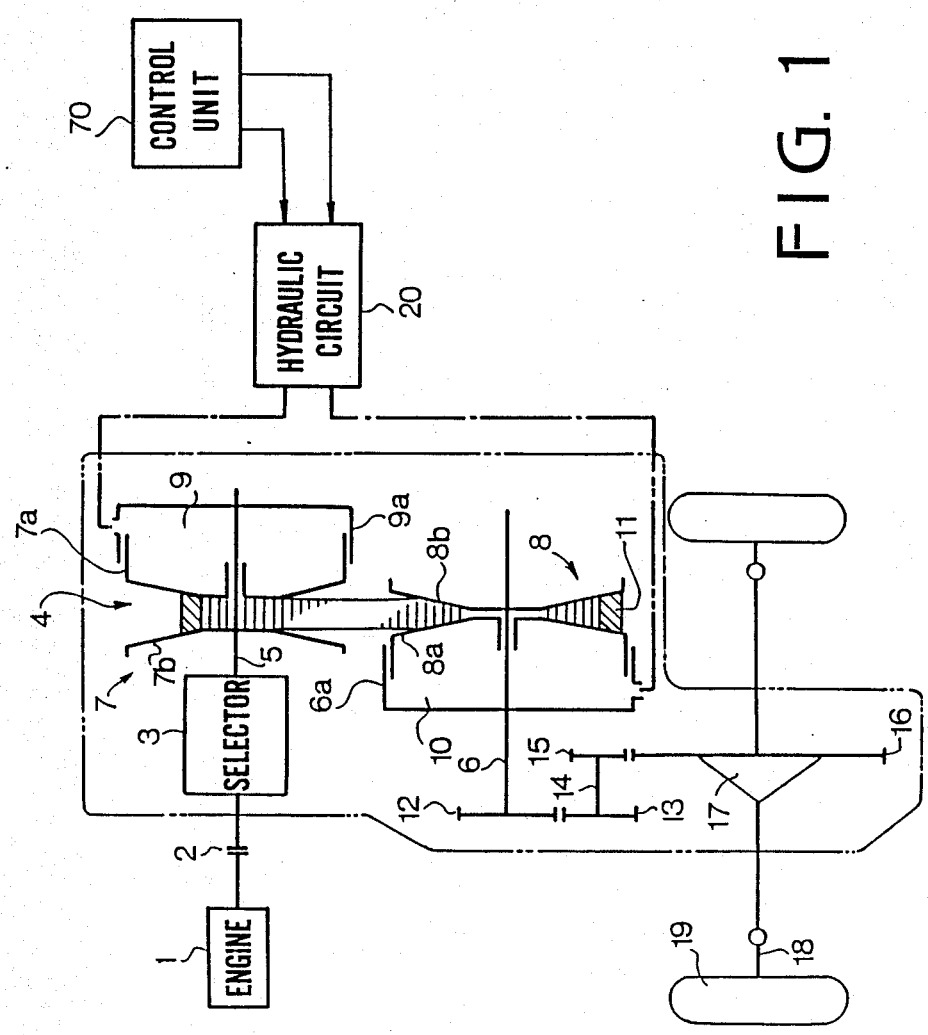
FIG. 1 is a schematic illustration of a continuously variable belt-drive transmission.

Referring to FIG. 1, the continuously variable belt-drive automatic transmission for a motor vehicle to which the present invention is applied comprises an electromagnetic powder clutch 2 for transmitting the power of an engine 1 to a transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a has a cylindrical portion which is slidably engaged in a cylinder 6a of the output shaft 6 to form a servo device. A chamber 10 of the servo device is also communicated with the hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of vehicle driving wheels 19 through a differential 17.

Figure 2A:
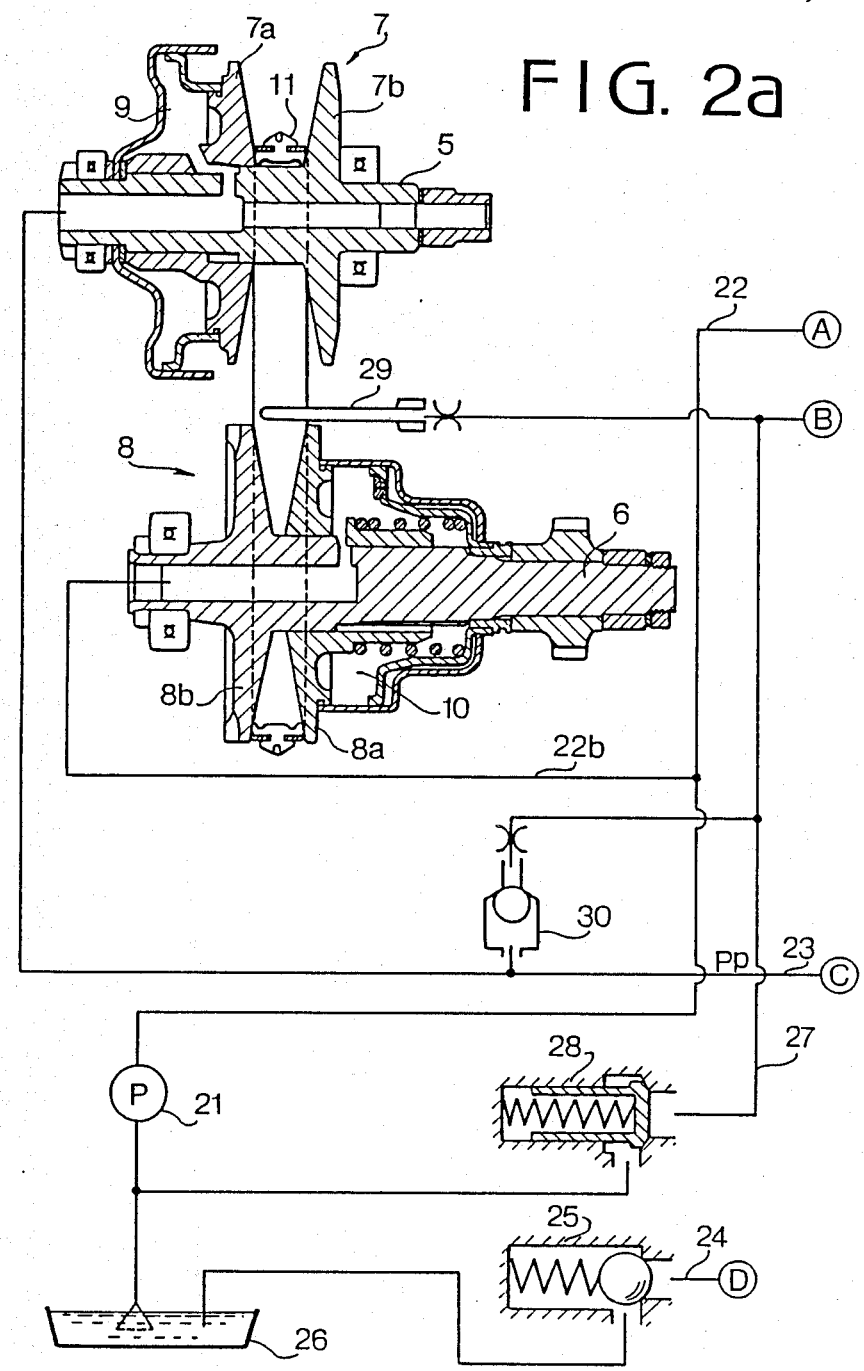
FIGS. 2a to 2c are schematic diagrams showing a control system according to the present invention.
Figure 2B:
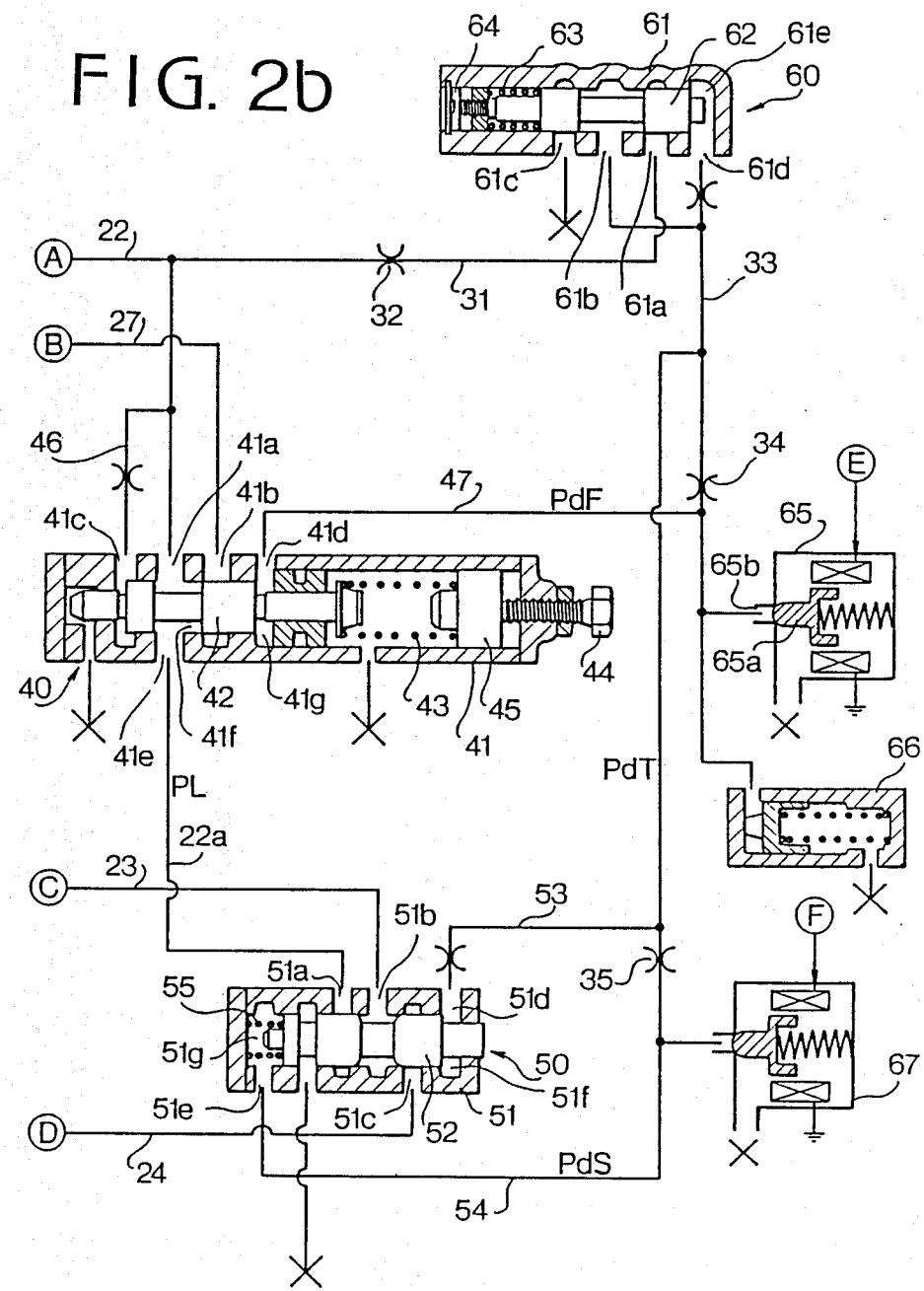
Figure 2C:
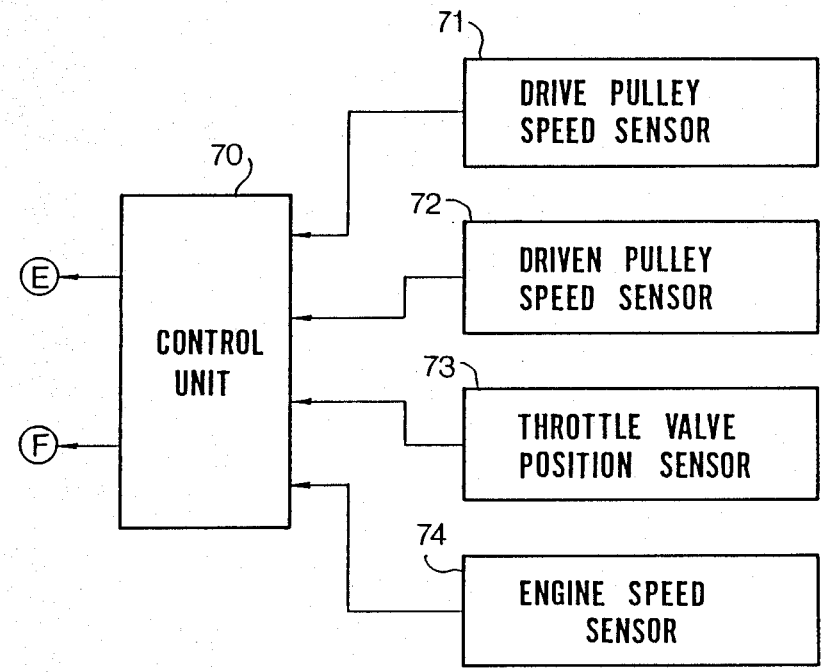

Referring to FIGS. 2a to 2c, the hydraulic control circuit 20 includes a line pressure control valve 40 and a transmission ratio control valve 50. The line pressure control valve 40 comprises a valve body 41, spool 42, and ports 41a, 41b, 41c, 41d, 41e and chambers 41f and 41g. The chamber 9 of the drive pulley 7 is applied with pressurized oil by an oil pump 21 from an oil reservoir 26 passing through a line pressure conduit 22, the parts 41a and 41e of the line pressure control valve 40, the transmission ratio control valve 50, and conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The spool 42 is applied with the pressurized oil supplied to a chamber communicating with port the 41c through a conduit 46. The spool 42 is urged to the left by the force of a spring 43 provided between one end of the spool and a retainer 45 the position of which is adjustable by a screw 44. The port 41a is communicated with the port 41b of a drain passage 27 in accordance with the position of a land of the spool 42.

The transmission ratio control valve 50 comprises a valve body 51, spool 52, and spring 55 for urging the spool in the downshift direction. A port 51b of the valve body 51 is selectively communicated with a pressure oil supply port 51a or a drain port 51c in accordance with the position of lands of spool 52. Port 51b communicates with the chamber 9 through the conduit 23, and the port 51a communicates with the line pressure control valve 40 through conduit 22a. The drain port 51c is communicated with the oil reservoir 26 through a conduit 24 and check valve 25. The drain port 41b of the line pressure control valve communicates with the oil reservoir 26 through passage 27 and a lubricating oil pressure providing valve 28 in the form of a check valve. The passage 27 is further communicated with the conduit 23 through a check valve 30. A part of the oil in the conduit 27 is supplied to the pulley 8 from a nozzle 29 to lubricate the pulley device.

The system of the present invention is provided with a pressure reducing valve 50, and solenoid operated on-off control valves 65 and 67. The pressure reducing valve 60 comprises a valve body 61, spool 62, inlet port 61a, basic pressure port 61b, drain port 61c, end chamber port 61d, spring 63 urging the spool 62 toward a chamber 61e. The basic pressure port 61b is positioned between the inlet port 61a and drain port 61c, and the spring 63 is positioned opposite the end chamber 61e against the regulator pressure. The load of the spring 63 can be adjusted by an adjust screw 64. The port 61a is connected to the pump 21 through a conduit 31 having an orifice 32 and conduit 22, and ports 61b and 61d are connected to a conduit 33. When the pressure in the conduit 33 reduces, the spool 62 is shifted to the right by spring 63, so that the port 61a communicates with the port 61b to increase the pressure in the conduit 33. Thus, a constant basic pressure of oil which is lower than the line pressure is provided in the conduit 33.

The conduit 33 is communicated with the port 41d of the line pressure control valve 40 through an orifice 34 and a passage 47. The conduit 33 is also communicated with the reservoir 26 through the solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 downstream of the orifice 35 so as to drain the oil in the chamber of the drive pulley to the reservoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, control pressures applied to the ports 41d, 51e are changed by changing the duty ratios of the pulses supplied to the control valves 65 and 67.

In the line pressure control valve 40, the relationship among spring load $F_S$ and line pressure PL, line pressure receiving area SL of the spool, first control pressure $P_dF$ at the port 41d, and control pressure receiving area $S_d$ is as follows:

$$F_S + P_dF \cdot S_d = PL \cdot SL$$

$$PL = (P_dF \cdot S_d + F_S)/SL$$

Figure 3:
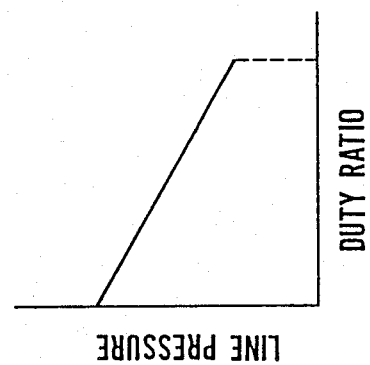
FIGS. 3a to 3c are graphs showing relationships between control pressure, line pressure and duty ratio.
Figure 3:
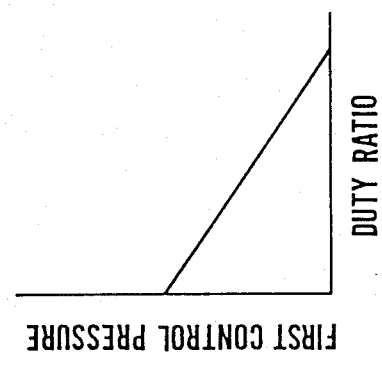
Figure 3:
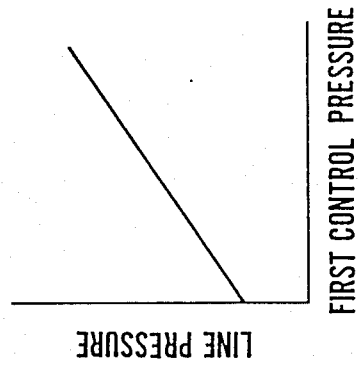

Accordingly, the line pressure PL is proportional to the control pressure $P_dF$, as shown in FIG. 3a.

FIG. 3b shows the relationship between the duty ratio and the first control pressure $P_dF$, and FIG. 3c shows the relationship between the duty ratio and the line pressure PL.

In the transmission ratio control valve, the pressure receiving area of the spool 52 at chamber 51g is set to a value larger than the area at the chamber 51f. On the other hand, a second control pressure $P_dS$ in the chamber 51g can be changed between a maximum value, which is the same as a third control pressure $P_dT$ in the chamber 51f when the duty ratio of pulses supplied to control valve 67 is 0%, and a minimum value by controlling the duty ratio of the pulses for operating the control valve 67. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51g. Further, the speed of the movement of the spool increases with decreasing duty ratio. The spool 52 is shifted to an oil drain position by decreasing the duty ratio. It will be understood that when the oil is supplied to the chamber 9, the transmission is upshifted.

The relationship between the dutry ratio (D) of the pulses applied to the solenoid operated control valve 67 and the transmission ratio (i) is explained hereinafter.

The transmission ratio changing speed (di/dt) is a function of flow rate Q of oil supplied to the chamber 9, and the flow rate Q is a function of the duty ratio D, the line pressure PL and primary pressure $P_p$ in the chamber 9, namely:

$$di/dt = F(Q) = F(D, PL, P_p)$$

The line pressure PL is determined by the transmission ratio i and engine torque, and the primary pressure $P_p$ is the chamber 9 is determined by the transmission ratio i and the line pressure PL. Accordingly, assuming the engine torque to be constant, $$di/dt = f(D, i)$$

$$D = f(di/dt, i)$$

Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = K(id - i)$$

where K is a coefficient.

Accordingly, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51g so as to upshift the transmission. The downshift is performed in the reverse manner.

The system is arranged to control the transmission ratio in accordance with the above described principle.

In the system, a drive pulley speed sensor 71, driven pulley speed sensor 72, throttle valve position sensor 73 and engine speed sensor 74 are provided. Signals of these sensors are fed to the control unit 70. The control unit 70 produces output pulses, the duty ratios of which are determined by the input signals. The pulses are supplied to the solenoids of the valves 65 and 67 so as to control the line pressure and transmission ratio.

In operation, while the vehicle is at a stop, the duty ratios of the pulses supplied to the valves 65 and 67 are small. Since the duty ratio is small, the pressure at the port 51e of the valve 50 is high. Accordingly, the spool 52 of the valve 50 is at the right end position and the drain port 51c communicates with the chamber 9 through the conduit 23, so the chamber 10 of the driven pulley is supplied with line pressure through the conduit 22b, and the chamber 9 of the drive pulley is drained. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to the axles of the driving wheels 19. Thus, the vehicle is started.

At that time the line pressure PL is at the highest value by the pressure control valve 40, since the duty ratio D for the valve 65 is small and the spool 42 of the control valve 40 is at the left end position. When the throttle valve is opened for acceleration, the duty ratio for the control valve 67 increases so that the pressure acting force in the chamber 51f of the control valve 50 becomes higher than that in the chamber 51g. Thus, the spool 52 is shifted to the left to communicate the port 51a with port 51b, so that oil is supplied to the chamber 9 through the conduit 23. On the other hand, the duty ratio for the control valve 65 is increased, so that the control pressure at the port 41d of the valve 40 becomes low. The spool 42 of the valve 40 is applied with the line pressure at the port 41c and the control pressure at the port 41d and the force of spring 43. Since the control pressure reduces, the spool 42 of the valve 40 is shifted to the right. Accordingly, the port 41a communicates with the port 41b of the drain passage 27. Thus, line pressure reduces, and the transmission is upshifted, since oil is still supplied to the chamber 9 through the control valve 50. When the opening degree of the throttle valve is reduced for deceleration, the duty ratio is reduced, thereby shifting the spool 52 to the right to drain the chamber 9. Thus, the transmission is downshifted.

In accordance with the present invention, the basic pressure for control valves 65 and 67 is obtained from the basic line pressure at a value lower than the line pressure. Accordingly, a constant basic pressure is provided so that reliable control of the transmission is performed.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting power of an internal combustion engine, the system comprising a drive pulley having a hydraulically shiftable disc and a first hydraulic cylinder for shifting the disc, a driven pulley having a hydraulically shiftable disc and a second hydraulic cylinder for operating the disc of the driven pulley, a belt engaged with both pulleys, a line pressure control valve having ports and a spool and provided for supplying line pressure, a transmission ratio control valve having ports and a spool, a first hydraulic circuit having a pump for supplying oil to the first hydraulic cylinder through the line pressure control valve and the transmission ratio control valve, wherein the improvement comprises:
   first means for applying a first pressure to adjacent a first end of at least one of the spools of the control valves for urging said at least one spool in one direction;
   second means for applying a second pressure to adjacent a second end of the at least one spool of the control valves so as to shift said at least one spool in the other direction;
   a pressure reducing valve communicated with the first hydraulic circuit for supplying a constant basic pressure of the oil lower than the line pressure;
   a second hydraulic circuit communicated with the pressure reducing valve for applying the basic pressure of the oil to adjacent at least one of the first and second ends of said at least one spool so as to apply the basic pressure to said at least one spool;
   control valve means provided in the second hydraulic circuit to control the basic pressure so as to apply the basic pressure to adjacent at least one of the first and second ends of said at least one spool as a control pressure; and
   means for controlling the control valve means so as to control the control pressure in accordance with operating conditions of the engine.

2. The control system according to claim 1 wherein the first means is a spring provided to urge the at least one spool, and the second means is provided for applying line pressure of the first hydraulic circuit as the second pressure.

3. The control system according to claim 1 wherein the control valve means is a solenoid operated on-off valve arranged to drain a part of the oil of the basic pressure.

4. The control system according to claim 1 wherein the first means is a spring provided to urge said at least one spool, and
   the second means is provided for applying the basic pressure as the second pressure.

5. The control system according to claim 1 wherein the pressure reducing valve comprises a spool, a spring for urging the spool, a inlet port, a drain port and a basic pressure port.

6. The control system according to claim 5 wherein the pressure reducing valve further comprises an adjust screw for adjusting the load of the spring.

7. The control system according to claim 1, wherein said control valve means controls the basic pressure applied only to adjacent one of the ends of said at least one spool.

8. The control system according to claim 1, wherein said second hydraulic circuit applies the basic pressure to adjacent said first and second ends of said transmission ratio control valve, and
   said control valve means controls the basic pressure applied only to adjacent one of the ends of said transmission ratio control valve.

9. The control system according to claim 8, wherein said one of said ends is said first end.

* * * * *